United States Patent [19]

Fournier et al.

[11] 4,389,232
[45] Jun. 21, 1983

[54] APPARATUS FOR MAKING FIBERS FROM THERMOPLASTIC MATERIALS

[76] Inventors: Rene Fournier, 310 Villa des Sapins, 60290 Vaux Sous Cambronne, Rantigny; Daniel Sainte-Foi, St. Germer, 56 rue Maurice Duchemin, 60600 Clermont, both of France

[21] Appl. No.: 346,279

[22] Filed: Feb. 5, 1982

[51] Int. Cl.³ .............................................. C03D 37/04
[52] U.S. Cl. ........................................ 65/16; 264/12; 425/7
[58] Field of Search ..................... 65/5, 16; 264/12; 425/7

[56] References Cited

U.S. PATENT DOCUMENTS 2,189,822 1/1936 Thomas et al.
2,515,738 9/1945 Slayter et al.
3,732,595 5/1973 Marshall ................................ 65/16
3,885,940 5/1975 Levecque et al. ...................... 65/5
4,052,183 10/1977 Levecque et al. ...................... 65/3
4,102,662 7/1978 Levecque et al. ...................... 65/5
4,137,059 1/1979 Levecque et al. ...................... 65/5
4,145,203 3/1979 Levecque et al. ..................... 65/16

*Primary Examiner*—Robert L. Lindsay, Jr.
*Attorney, Agent, or Firm*—John T. Synnestvedt; Kenneth P. Synnestvedt; Richard D. Weber

[57] ABSTRACT

Fiberization of thermoplastic materials is effected by a technique employing an attenuating blast having a Coanda surface on the blast nozzle lip, the arrangement providing for delivery of a stream of molten material into the region of gaseous currents flowing over the Coanda surface into the blast. Provision is also made for employment of a secondary jet directed to flow over at least a part of the Coanda surface into the blast.

11 Claims, 6 Drawing Figures

APPARATUS FOR MAKING FIBERS FROM THERMOPLASTIC MATERIALS

BACKGROUND AND STATEMENT OF OBJECTS

This invention relates to fiberization of thermoplastic materials, particularly glass; and the invention is concerned with equipment employing gas streams of blasts for the purpose of effecting attenuation of thermoplastic materials in attenuable condition, for instance, effecting fiberization of molten glass.

Although the invention is applicable to the fiberization of a variety of materials, especially thermoplastic materials, the invention is particularly useful in connection with formation of fibers from molten glass; and for this reason, much of the following description refers to the formation of fibers from glass.

In various gas blast attenuation techniques, a blast nozzle is employed for delivery of the attenuating gas stream; and provision is made for delivering a stream of the molten material into the blast delivered from the nozzle, it being preferred that the point of delivery of the molten material into the gas stream should be relatively close to the orifice from which the blast or attenuating gas stream is delivered.

The close proximity of the point of delivery of the attenuable material to the discharge orifice is of importance in order to make maximum use of the energy of the attenuating blast. However, the close proximity of the point of entrance of the attenuable stream into the blast to the blast nozzle has a tendency under certain conditions to result in undesirable contact of portions of particles of the glass stream with the nozzle structure. Indeed, this sometimes results in build-up of deposits of molten material on the nozzle, with consequent periodic delivery of portions of such deposits into the region of attenuation in the gas blast. In turn, this has a tendency to build up undesired particles or "shot" in the fibrous product being made.

One of the principal objects of the invention is to provide an arrangement providing for delivery of the molten stream into the gas blast in a zone very close to the blast discharge orifice, while at the same time, minimizing contact of the molten stream or particles thereof with the nozzle structure.

For the above purposes, the invention contemplates the employment of a blast nozzle having a convexly curved surface adjacent to one side of the discharging blast, together with a glass supply means delivering a molten stream to the blast in the region of said convexly curved surface. Provision is also made for the flow, preferably laminar flow, of air or gas over the convexly curved surface in a direction approaching the discharge orifice of the blast. In this way, a Coanda effect is developed along the convexly curved surface of the blast nozzle lip; and this flow aids in maintaining the molten stream out of contact with the blast nozzle lip, as the molten stream is delivered into the blast, even when the region of delivery is quite close to the blast nozzle, as is desirable.

In a preferred embodiment, as fully described hereinafter and illustrated in the drawings, the action above described is further enhanced by the employment of a secondary jet or gas stream for each stream of molten material, the secondary jets being delivered in paths approaching the convexly curved Coanda surface of the blast nozzle lip, and thereby enhancing the development of the Coanda action over the curved surface of the nozzle lip. In this preferred embodiment, individual streams of attenuable material, for example, molten glass, are delivered initially into the influence of the secondary jets, the streams of molten material being carried by the jets into the region of the Coanda flow over the blast nozzle lip and thence into the blast itself for attenuation.

It is also contemplated in accordance with the invention that the secondary jets be subjected to the influence of a deflector of the kind fully disclosed in Lavecque et al U.S. Pat. No. 4,102,662, issued July 25, 1978. This type of deflected secondary jets provides a zone of laminar flow in each jet into which the associated stream of molten material is initially delivered.

The foregoing arrangements provide for minimization of undesirable deposits on the blast nozzle lip, even when the various components of the fiberizing system are brought very close together, as is frequently desirable in order to make maximum use of the energy expended in operating the system, and thereby correspondingly reduce the overall cost of fiber production.

BRIEF DESCRIPTION OF THE DRAWINGS

How the foregoing objects and advantages are attained will appear more fully from the following description referring to the accompanying drawings, in which.

DETAILED DESCRIPTION

Figure 1:
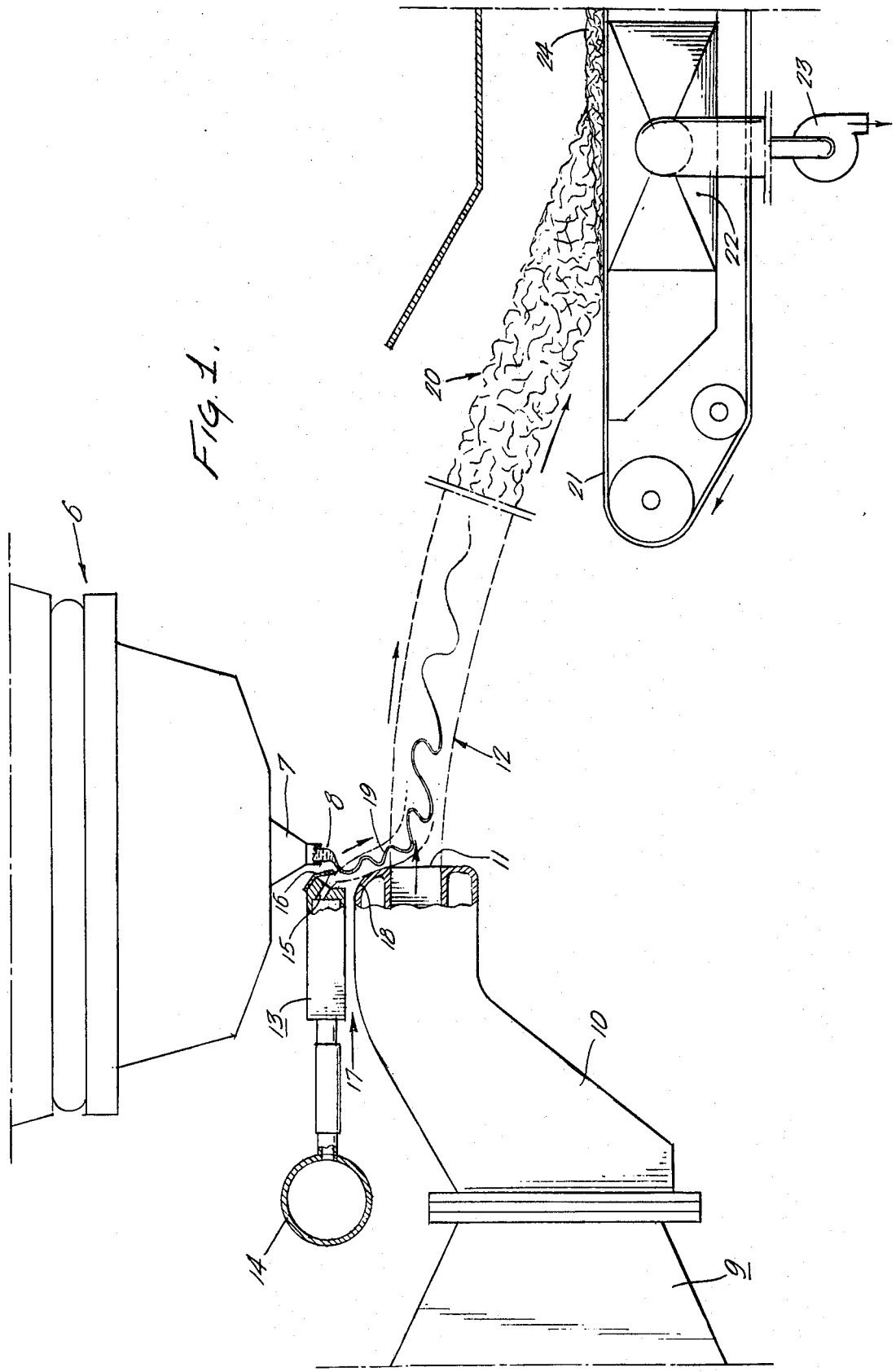
FIG. 1 is a somewhat diagrammatic side elevational view, with a few parts shown in vertical section, illustrating the general arrangement of the major components of equipment constructed according to a preferred embodiment of the invention and including not only the components in the fiberizing centers, but also a fiber-collecting conveyor on which a fibrous mat is deposited.

In the overall schematic view of FIG. 1, the reference numeral 6 indicates a portion of a melting furnace, or of a suitable forehearth for delivering glass to a bushing 7 having a series of orifices through which bulbs of molten glass are delivered downwardly, one of which is indicated at 8.

A blast generator is indicated at 9, this generator having a nozzle structure 10 with a delivery orifice 11 for the delivery of the attenuating blast which is generally indicated at 12. Although various features of the invention are applicable to installations which are somewhat differently oriented, in the embodiment of FIGS. 1 to 5, the blast is delivered in a generally horizontal direction in a zone below the glass supply orifices of the bushing 7. In spaced relation above the upper side of the blast nozzle 10, a secondary jet manifold 13 is arranged, this manifold being supplied with pressurized jet fluid, for instance air, through the supply duct 14. At one edge of the jet manifold 13, a series of jet orifices 15 are provided for delivery of jets downwardly and toward the right, as viewed in FIG. 1, the jet flow being influenced by the deflector plate 16 in a manner explained in the prior U.S. Pat. No. 4,102,662, above identified, and also explained hereinafter.

A flow of ambient air in a direction indicated by the arrow 17 into the space between the nozzle 10 and the jet manifold 13, in the manner more fully described hereinafter, together with the flow delivered from the secondary jet nozzles 15, merge and flow over the convexly curved blast nozzle lip 18 into the blast 12 close to the region where the blast is delivered from the orifice 11.

In a manner more fully explained hereinafter, glass streams 19 are drawn downwardly from the bulbs 8 into the jet flow; and the streams 19 of the glass are carried into the influence of the attenuating blast 12, as will also be further explained. The attenuated fibers, indicated generally at 20, are deposited on the upper surface of the endless perforated fiber-collecting conveyor 21 in the form of a blanket 24. Suction boxes 22 with suction fans 23 provide for build-up of the fibrous blanket 24 on the upper conveyor surface. As is known, provision may be made for applying a thermosetting binder to the fibers, preferably in advance of laydown on the conveyor surface; and the blanket thus formed is carried by the conveyor through a mat curing oven (not shown) of known type.

Figure 2:
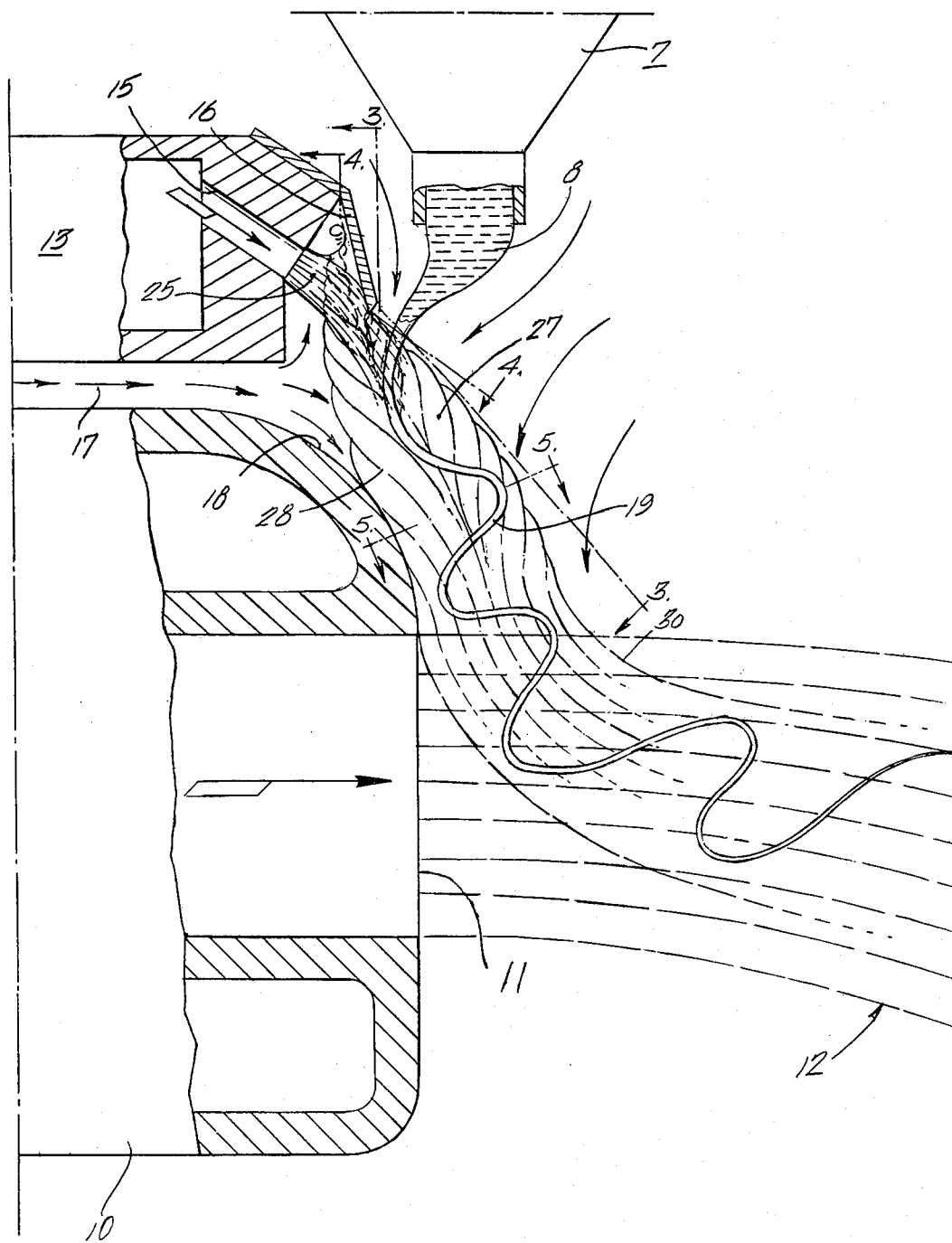
FIG. 2 is a cross-sectional fragmentary and enlarged view of the fiberizing equipment shown in FIG. 1, and illustrating certain phases of the activity of the blast, of the stream of gas introduced over the nozzle lip, of the secondary jet system and of the glass or thermoplastic material delivery means, this view being taken on the line 2—2 on FIG. 3.

In considering the action of the components in the fiberizing system disclosed herein, it is first pointed out that in FIG. 2, the components of a single fiberizing center are shown, this figure representing an enlargement of certain parts shown in vertical section in the central region of FIG. 1. It is to be kept in mind that it is contemplated that there be a sequence of such fiberizing centers located in spaced side-by-side relation. Each of such spaced fiberizing centers includes a secondary jet orifice 15 and a glass bulb 8; and a plurality of pairs of these two components will preferably be associated with a single blast nozzle 10 delivering a blast 12 of relatively large dimension in a direction perpendicular to the plane of FIG. 2. Thus, the convexly curved external blast nozzle lip 18 will also be of extended dimension in a direction perpendicular to the plane of FIG. 2. The same is true with respect to the secondary jet manifold 13 and the deflector plate 16.

Referring now more in detail to the illustration of the fiberizing center shown in FIG. 2, it is first pointed out that in this embodiment, the convexly curved surface of the blast nozzle lip, indicated at 18, extends throughout an arc of approximately 90°, with the orifice 11 of the blast nozzle lying in a plane which is tangent to one edge of the curved nozzle lip 18. The path of the blast is thus generally perpendicular to the adjoining edge of the curved surface 18.

The flow passage for the gas flow, indicated at 17, entering the system between the upper surface of the nozzle 10 and the lower surface of the jet manifold 13, is generally tangent to the other edge of the curved surface 18; and in view of this geometric relationship, the flow, indicated at 17, is subjected to the Coanda action of the surface 18, the flow continuing around the surface and ultimately entering the influence of the blast 12 in a direction perpendicular to the path of delivery of the blast through the blast orifice 11.

Figure 3:
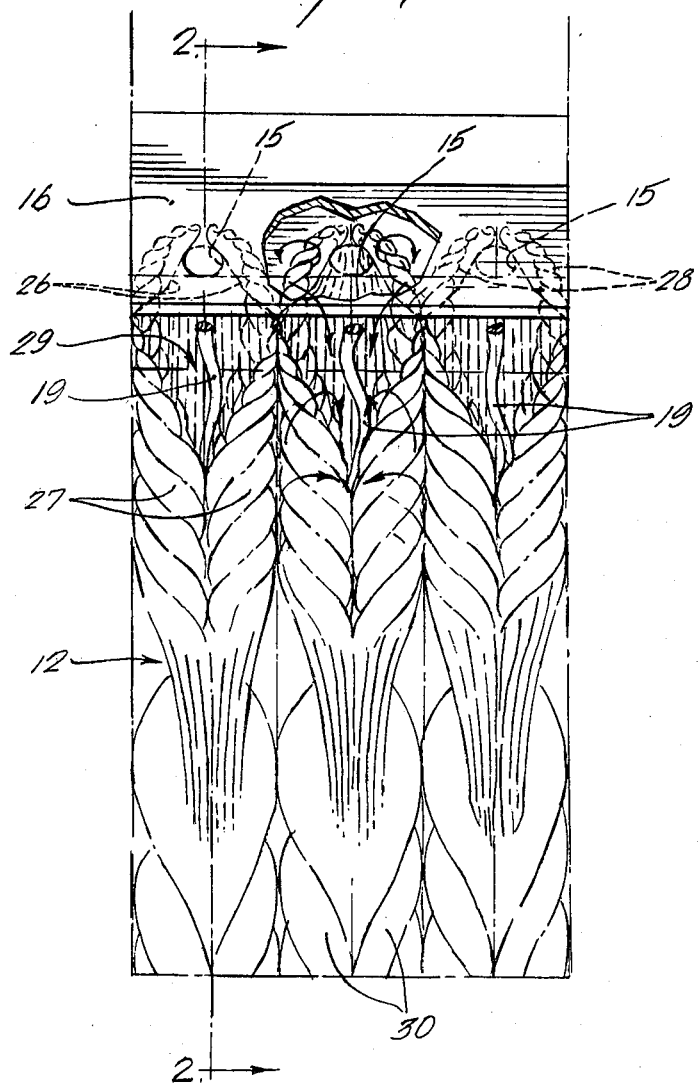
FIG. 3 is a view taken generally as indicated by the line 3—3 applied to FIG. 2 and illustrating somewhat diagrammatically certain currents or miniature tornadoes which are developed in the flow of the secondary jets toward the region of the blast boundary, certain parts in this figure being broken away to better illustrate parts lying within.
Figure 4:
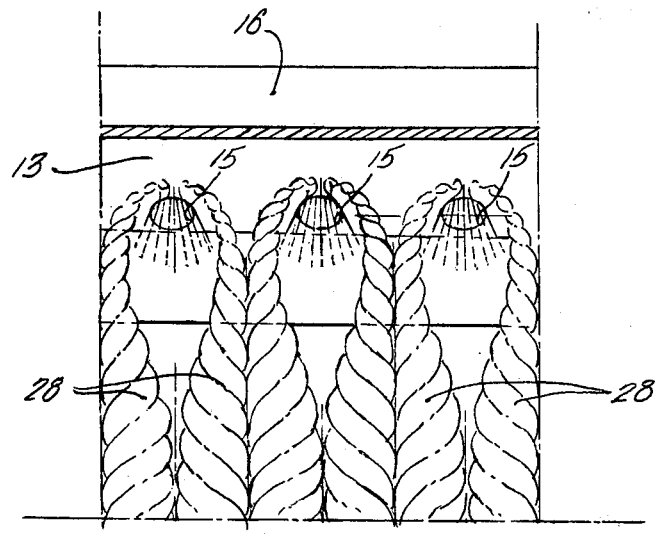
FIG. 4 is a view of the general type of FIG. 3 but taken on the line 4—4 as applied to FIG. 2.
Figure 5:
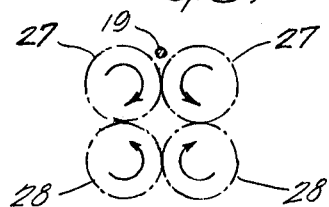
FIG. 5 is a diagram illustrating the direction of rotation of certain pairs of whirling currents or miniature tornadoes developed in the system illustrated in the other figures, this diagram representing those directions of rotation when viewed in the plane indicated by the line 5—5 as applied to FIG. 2.

The secondary jet 25, delivered from the jet orifice 15, is directed downwardly and toward the right, as viewed in FIG. 2, in a position partially intercepted by the lower edge of the deflector plate 16; and the consequent deflection of the jets results in lateral spreading of the flow of each jet, as indicated at 26 in FIG. 3. The components of the fiberizing centers are preferably arranged so that the flow from adjacent jet orifices 15 spreads sufficiently to cause the adjoining deflected portions of the jets to impinge upon each other; and this, in turn, tends to develop pairs of oppositely rotating tornadoes or whirling currents 27—27 having the relative directions of rotation indicated by arrows in FIGS. 3 and 5. The development of each pair of tornadoes and the action of the deflector plate 16 also tends to establish a laminar flow zone 29 just downstream of the lower edge of the deflector plate 16 and lying between the tornadoes 27—27. This laminar flow zone is stable and of low pressure, thereby tending to induce inflow from the ambient atmosphere, as is indicated by arrows applied to FIG. 2, in consequence of which a glass stream is drawn into that zone from the associated bulb 8 of molten glass. This action is fully explained in the prior U.S. Pat. No. 4,102,662, above identified, to which reference may also be made for further information regarding dimensional interrelationships of various of these components and also for ranges of temperature, velocities and kinetic energy preferably employed.

The relationship of the components of the fiberizing centers, including the deflector plate, also results in the development of a second pair of whirling currents or miniature tornadoes, indicated at 28 in FIGS. 2, 3, 4 and 5. This pair of tornadoes have their inception in a region lying beneath the deflector plate 16 and above the secondary jet, in the manner of a yoke, as clearly appears in FIGS. 3 and 4. The pair of underlying tornadoes 28 are not as intense as the overlying pair 27, in view of which the action of the tornadoes 27 predominates in the activity of the jet flow.

The tornadoes of each jet flow tend to merge and carry the glass stream 19 downwardly into the blast 12; and as these jet systems penetrate into the blast, they develop tornadoes within the blast, as indicated at 30 in FIG. 3, in the manner fully explained in the prior U.S. Pat. No. 4,102,662, above identified. That patent also gives additional explanation and description of the action of a deflector plate 16 in association with a series of jet orifices and glass streams.

In accordance with the arrangement of the present invention, the positioning of the secondary jets 15 and the deflector plate 16 is arranged so that the deflected jet system is delivered in a generally downward direction closely adjacent to the convexly curved surface 18 of the adjoining blast nozzle lip; and in consequence, this jet system contributes to the development of the Coanda action in relation to the inflow of air, as indicated at 17, in the space between the blast nozzle and the jet manifold. It is here noted that the admission of air in the path indicated at 17, may, if desired, be augmented by the employment of a pressurized system; but for many purposes, and in the embodiment herein illustrated, the action of the jets in the region of the Coanda surface 18 is effective in establishing substantial induction or inflow of air in the path indicated at 17, even without employment of a pressurized system.

The Coanda flow of the jets and of the induced air 17 over the convexly curved nozzle lip 18 has a number of advantages. Thus, this flow tends to stabilize the action of the jets and of the introduction of the streams of glass from the bulbs 8 into the jet flow and ultimately into the blast 12. In addition, the induction of air and the Coanda flow over the surface 18 tends to minimize the deposit of molten material on the blast nozzle lip; and this is true even where the components of the fiberizing system are brought together in a relatively closely coupled relationship, as is desirable in order to make the most effective use of the power expended in developing the blast and jet. The interrelation of the components, with the air flow induced in the path indicated at 17, also aids in the maintenance of the desired temperature conditions as between different components of the system, notwithstanding the fact that the components are relatively close to each other.

Figure 6:
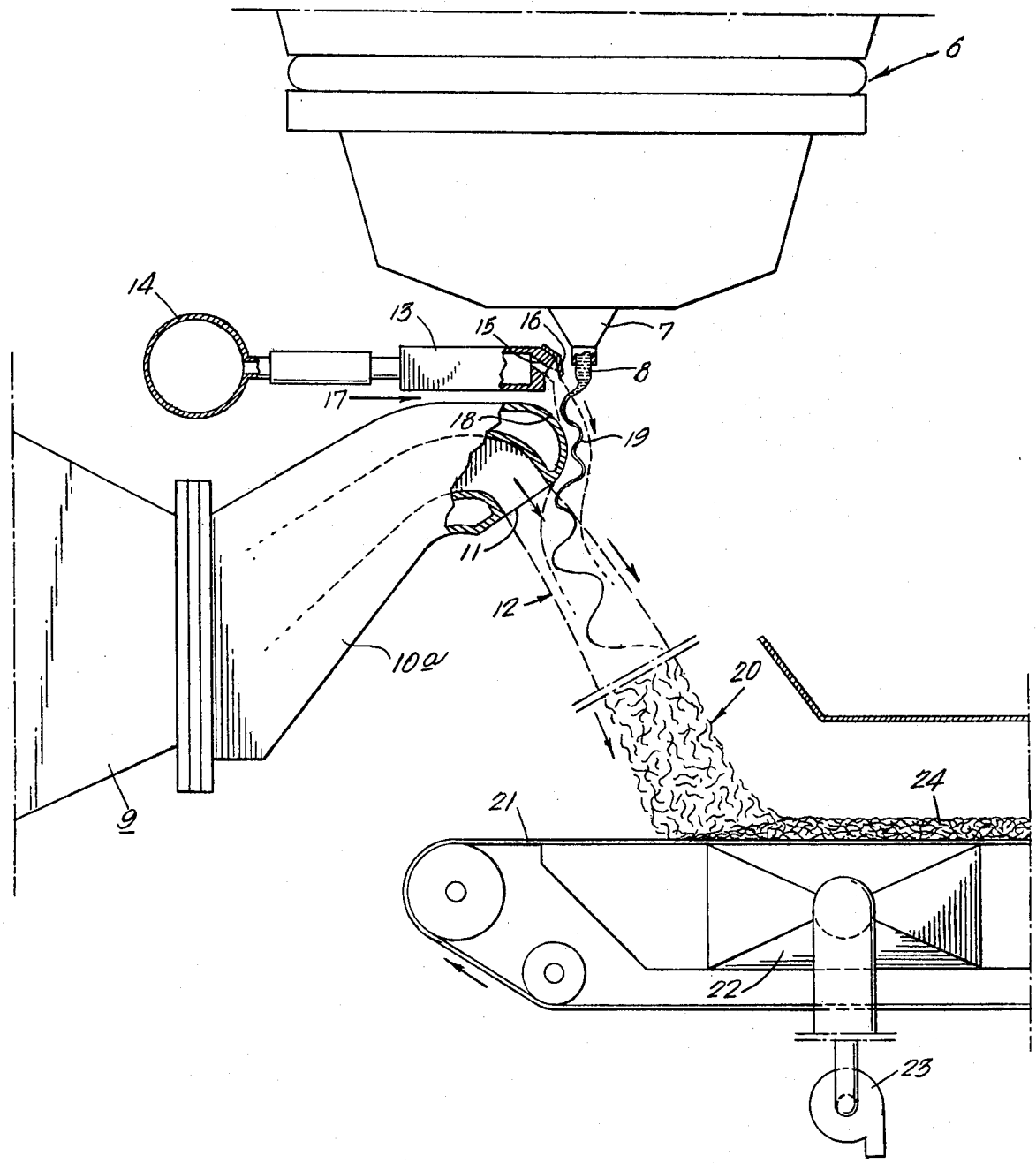
FIG. 6 is a view similar to FIG. 1 but illustrating a second embodiment in which the blast nozzle is arranged to direct the blast in a direction having a downward component.

Turning now to FIG. 6, it is pointed out that in this second embodiment, the various components described above in connection with the first embodiment as shown in FIGS. 1 to 5, are also present in FIG. 6. However, in FIG. 6, the blast nozzle, which is here indicated by the reference numeral 10a, is of different shape than the nozzle 10 of the first embodiment and the blast orifice 11 is differently positioned.

Thus, the delivery end of the nozzle 10a is configured to bring the delivery orifice 11 to a position directing the blast 12 somewhat downwardly, instead of substantially horizontally as in the embodiment of FIGS. 1 to 5. Thus, the blast is here directed downwardly at an angle within about 45° from the vertical. In an embodiment of this type, the blast may even be directed in a path approaching the vertical; and this embodiment may, therefore, attain not only the advantages above described with reference to the first embodiment, but also various other advantages as fully brought out in the companion U.S. application Ser. No. 244,129, filed Mar. 16, 1981, and assigned to the assignee of the present application. As brought out in said companion application, a substantial downward component in the path of the blast provides for more effective use of available plant area or floor space in the production of fiber blankets or boards. Reference may be had to said companion application for other advantages of a downwardly directed blast.

Although the plane of the blast orifice 11 in FIG. 6 is substantially tangent to the adjoining edge of the Coanda surface 18 on the blast nozzle lip (as is the case in the first embodiment), the Coanda surface 18 extends thoroughout an arc substantially larger than in the first embodiment. In FIG. 6, the Coanda surface extends throughout of at least about 135° but may extend throughout an even larger arc. The desired downward direction of the blast orifice may also be provided by angularly inclining the entire blast generator; but in any event, it is preferred to retain the flow passage providing for introduction of the gas flow 17, for reasons already explained.

Although the system of the present invention may be employed in attenuation techniques of varying characteristics, it is preferred that the ratio of the kinetic energy of the jets in relation to the blast be such as to provide for toration, i.e., penetration of each jet into the blast in consequence of a higher kinetic energy of the jet per unit of volume as compared with that of the blast. Although the jet may comprise a heated pressurized supply, for most purposes, that is not needed; and a pressurized air supply at ambient temperatures may be employed, provided the jet pressure is sufficient to provide kinetic energy in the jet which is higher per unit of volume than that of the blast. The attenuating blast ordinarily should have relatively high temperatures, in order to provide for effective attenuation of the glass streams. More specifically, the temperature and kinetic energy relationships of the blast and jets may conform with those fully set out in the prior U.S. Pat. No. 4,102,662, fully identified above.

It will be noted in connection with the configurations herein illustrated that the air stream 17 and the blast 12 are established by structure having walls or surfaces defining separate gas flow passages with associated orifices for delivery of gas streams in spaced relation to each other but in the same general direction, in the embodiment shown in FIGS. 1 to 5, in which the general direction of the blast is substantially horizontal. However, as shown in FIG. 6, the stream 17 and the blast 12 need not necessarily be in the same direction.

Preferably, the flow path for the stream 17 is smaller than that of the blast nozzle 10 and its orifice 11; and the blast nozzle lip lying between the flow path 17 and the blast nozzle orifice 11 having a convexly curved surface extending between the two passages, so that the blast tends to induce flow over the curved surface. This provides the Coanda action above described, so that the flow indicated at 17, is influenced by the curved nozzle lip 18 and caused to be deflected downwardly into the blast.

We claim:

1. Equipment for use in fiberizing attenuable thermoplastic material, including means for establishing gas streams comprising structure having walls or surfaces defining separate gas flow passages with associated orifices for delivery of gas streams in spaced relation to each other but in the same general direction, one of the orifices having a cross section substantially greater than that of the other orifice, a portion of said structure lying between and having oppositely presented first and second walls in part defining portions of separate gas flow passages, said first wall in part defining the gas flow passage associated with and adjoining the larger orifice, said second wall in part defining the gas flow passage associated with and adjoining the smaller orifice, said portion of said structure further having a convexly curved surface extending between said orifices externally of said passages, said first wall extending generally transversely to one edge of said external convexly curved surface, and said second wall being generally tangent to the other edge of said external convexly curved surface, thereby imparting Coanda guiding effect to the gas stream delivered from the orifice of smaller cross section with resultant deflection of the gas stream of smaller cross section transversely into the path of the gas stream of larger cross section, and means for delivering a stream of attenuable material in attenuable condition into the gas stream flowing on said external convex surface.

2. Equipment as defined in claim 1 and further including a generator of a gaseous jet, the jet being directed to flow over said convex surface.

3. Equipment as defined in claim 2 in which a plurality of stream delivering means and a plurality of jet generators are arranged in pairs.

4. Equipment as defined in claim 1 in which the gas flow passage having the larger orifice comprises a pressurized gas blast delivery passage, and in which the gas flow passage having the smaller orifice comprises a nonpressurized flow passage for ambient air induced by the delivery of said pressurized gas blast.

5. Equipment as defined in claim 4 and further including a generator of a gaseous jet, the jet being directed to flow over said convex surface, thereby augmenting the induction of ambient air through the gas flow passage having the smaller orifice.

6. Equipment for use in fiberizing attenuable material comprising a blast generator having a gas flow passage and a discharge orifice with surrounding lips, one of which has an external convexly curved surface one edge of which extends transversely of the flow passage, jet generating means for delivering a jet in a path extending in tangent relation to a portion of said external convexly curved surface in a region spaced from the blast orifice with resultant Coanda deflection of the jet transversely into the blast, and means for delivering a stream of attenuable material in attenuable condition into the jet to be carried thereby into the blast.

7. Equipment as defined in claim 6 in which the means for delivering the attenuable stream is arranged to deliver said stream into the jet as it flows over said convexly curved surface.

8. Equipment as defined in claim 6 in which the jet generating means comprises a plurality of side-by-side orifices and in which separate delivery means for streams of attenuable material are respectively associated with the jet orifices.

9. Equipment for use in fiberizing attenuable material comprising a blast generator having a gas flow passage and a discharge orifice with surrounding lips, one of which has an external convexly curved surface one edge of which extends transversely of the flow passage, jet generating means including a jet orifice of smaller cross section than the discharge orifice of the blast generator, means for deflecting the jet into a path extended in tangent relation to a portion of said external convexly curved surface in a region spaced from the blast orifice with resultant Coanda deflection of the deflected jet transversely into the blast, and means for delivering a stream of attenuable material in attenuable condition into the deflected jet to be carried thereby into the blast.

10. Equipment as defined in claim 9 in which the deflecting means is positioned between the jet generating means and the means for delivering the attenuable stream.

11. Equipment for use in fiberizing attenuable thermoplastic material, including means for establishing gas streams comprising structure having walls or surfaces defining separate gas flow passages with associated orifices for delivery of gas streams in spaced relation to each other, one of the orifices having a cross section substantially greater than that of the other orifice and being directed downwardly, a portion of said structure lying between and having oppositely presented first and second walls in part defining portions of separate gas flow passages, said first wall in part defining the gas flow passage associated with and adjoining the larger orifice, said second wall in part defining the gas flow passage associated with and adjoining the smaller orifice, said portion of said structure further having a convexly curved surface extending between said orifices externally of said passages, said first wall extending generally transversely to one edge of said external convexly curved surface, and said second wall being generally tangent to the other edge of said external convexly curved surface, thereby imparting Coanda guiding effect to the gas stream delivered from the orifice of smaller cross section with resultant deflection of the gas stream of smaller cross section transversely into the path of the gas stream of larger cross section, and means for delivering a stream of attenuable material in attenuable condition into the gas stream flowing on said external convex surface.

* * * * *